United States Patent [19]

Humphrey

[11] Patent Number: 5,381,932
[45] Date of Patent: Jan. 17, 1995

[54] CONDIMENT PUMP

[75] Inventor: James E. Humphrey, Cheyenne, Wyo.

[73] Assignee: American Wyott Corporation, Cheyenne, Wyo.

[21] Appl. No.: 156,970

[22] Filed: Nov. 24, 1993

Related U.S. Application Data

[63] Continuation of Ser. No. 868,205, Apr. 14, 1992, abandoned.

[51] Int. Cl.[6] .............................................. G01F 11/04
[52] U.S. Cl. ..................................... 222/321; 222/385
[58] Field of Search ................. 222/385, 321; 239/333

[56] References Cited

U.S. PATENT DOCUMENTS

| | | | |
|---|---|---|---|
| 1,951,910 | 3/1934 | Heffner et al. | 222/385 X |
| 2,119,884 | 6/1938 | Lohse | 222/385 X |
| 2,569,903 | 10/1951 | Santarelli | 222/385 |
| 3,332,585 | 7/1967 | Cox | 222/385 X |
| 3,458,090 | 7/1969 | Scoggin | 222/385 X |
| 4,869,404 | 9/1989 | Elliott | 222/385 |

FOREIGN PATENT DOCUMENTS 3936468 6/1991 Germany ............................. 222/321

OTHER PUBLICATIONS

James E. Elliott (American Wyott), Figure 1, Spring 1989.

Primary Examiner—Andres Kashnikow
Assistant Examiner—Kenneth Bomberg
Attorney, Agent, or Firm—Herbert J. Hammond

[57] ABSTRACT

An improved condiment pump has a container and a lid. A cylinder extends downwardly into the container and contains a piston and a piston rod. A lower ball valve is located near the bottom of the cylinder, and a side arm tube extends upwardly from the upper ball valve. An upper ball valve is located at the top of the side arm tube, and a spout extends upwardly from the upper ball valve. A plug covers the upper end of the upper ball valve. A spout extension extends downwardly into the upper ball valve to maintain the ball a predetermined distance from a hole in the plug, permitting passage of condiment chunks through the spout.

11 Claims, 2 Drawing Sheets

CONDIMENT PUMP

This application is a continuation of application Ser. No. 07/868,205 filed on Apr. 14, 1992, now abandoned.

TECHNICAL FIELD

This invention relates generally to the field of dispensing devices and more particularly to pump dispensers for dispensing condiments.

BACKGROUND OF THE INVENTION

Manual pump dispensers are used by employees and customers of food businesses to dispense condiments such as ketchup, mustard, mayonnaise, and salad dressing. Prior art pumps dispense liquids easily, but have difficulty dispensing liquids containing solids such as bleu cheese dressing, picante sauce or chili, and thick sauces such as pizza sauce. A thick sauce or liquid/solid combination tends to plug the spout of the pump, impeding the flow of liquids from the pump and/or preventing the solid chunks from exiting the pump.

U.S. Pat. No. 4,69,404 to Elliott addressed the chunky condiment problem using a notched washer plate overlying the upper ball valve chamber. The body of the upper ball valve chamber protruded through a hole and clamped to the lid. A concentrically located post extended downwardly from the washer plate into the upper ball valve chamber to prevent the upper valve ball from plugging the lower opening of the spout. Condiment exited the upper ball valve chamber through an eccentrically located hole in the washer plate. The lid was net permanently fastened to the pump. Therefore, a variety of lids could be used without affecting the design of the pump.

The Elliott condiment pump required close tolerances and large diameters in clamping the upper ball valve chamber to the lid. The Elliott condiment pump was expensive to construct due to the raw material costs and the machining costs, including the eccentric opening. Although the Elliott condiment pump dispensed chunky condiments, it experienced dripping from the spout when dispensing condiments having a thin consistency.

American Wyott Corporation offered for sale a condiment pump for dispensing foods that must be kept hot to avoid bacteria growth. The condiment pump included a double container. with the outer container holding hot water, and the inner container holding the condiment. A heating distribution block attached to the spout maintained the temperature of the condiment inside the spout. The spout dispensed condiment out the side of the container. A plug covered the upper ball valve chamber. A plug extension extended downwardly from the plug into the upper ball valve chamber to prevent the valve ball from plugging the spout.

The double container condiment pump was costly to produce, especially due to the complex tooling required to construct the lid. Further, the condiment pump was not able to handle the wide variety of lid shapes for foods that do not require being kept hot.

SUMMARY OF THE INVENTION

The present invention comprises a highly practical condiment pump which overcomes the foregoing disadvantages associated with the prior art.

The condiment pump has a cylinder which extends downwardly into a container. A piston rod is connected to a piston within the cylinder, and extends upwardly above the top of the container. A spring biases the piston upward.

A lower ball valve is located near the bottom of the cylinder. A side arm tube extends upwardly from the lower ball valve. An upper ball valve is located at the top of the side arm tube. A plug covers the upper end of the upper ball valve. A spout extends upwardly through a hole in the lid of the container. An extension of the spout extends downwardly into the upper ball valve to prevent the valve ball from blocking the end of the spout. The spout extension may have various shapes as desired.

In an alternative embodiment, a hollow piston rod serves the function of the side arm tube. An upper ball valve is located at the uDper end of the piston rod. A plug having no hole covers the top of the upper ball valve chamber. An extension similar to the spout extension of the preferred embodiment condiment pump extends downwardly from the plug. The spout extension may have various shapes as desired. A knob is located above the plug. A spout extends outward from the side of the upper ball valve. The spout moves up and down with the knob.

DESCRIPTION OF THE DRAWINGS

For a more complete understanding of the present invention and the advantages thereof, reference is now made to the following Detailed Description taken in conjunction with the accompanying Drawings in which.

DETAILED DESCRIPTION

Figure 1:
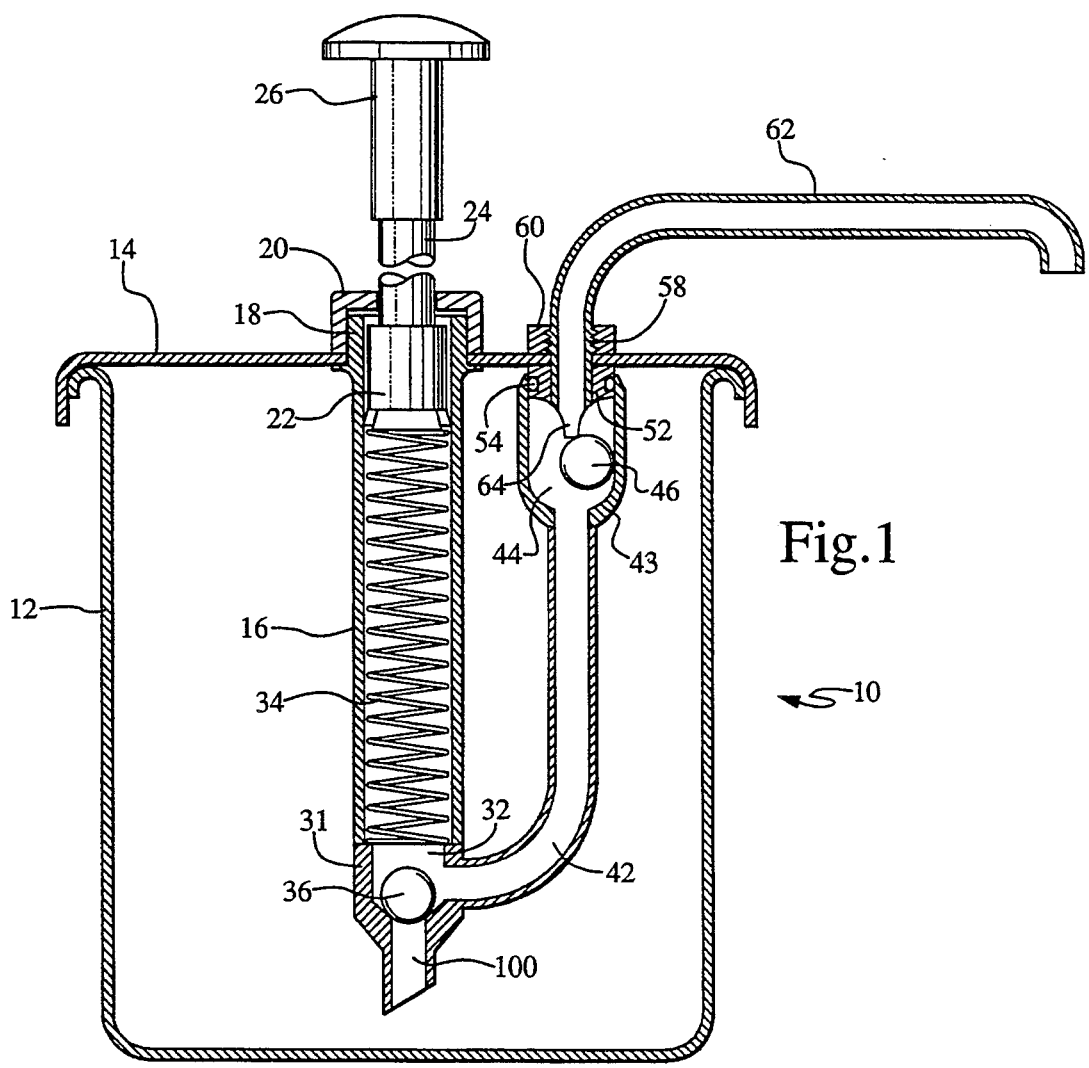
FIG. 1 is a cross-sectional side view of one embodiment of the condiment pump according to the present invention.

Referring now to the Drawings, wherein like reference characters designate like ot, similar parts throughout the three views, FIG. 1 is a cross-sectional side view of one embodiment of the condiment pump 10 according to the present invention.

The condiment pump 10 has a container 12, which may be cylindrical. A lid 14 covers container 12.

A cylinder 16 extends downwardly into container 12. The threaded upper end 18 of cylinder 16 extends upwardly through a concentric hole in lid 14. A threaded cylinder nut 20 engages the threaded upper end 18 of the cylinder 16 to secure cylinder 16 to lid 14.

Within cylinder 16 is a piston 22. A piston rod 24 extends upwardly from piston 22 through a hole in the cylinder nut 20. Attached to the upper end of the piston rod 24 is a knob 26 for manual operation of condiment pump 10.

A lower ball valve 31 is located near the bottom of cylinder 16. A spring 34 is positioned between the lower end of piston 22 and lower ball valve 31. Spring 34 biases piston 22 upward in cylinder 16.

A valve ball 36 is located in the lower ball valve chamber 32 of lower ball valve 31. When spring 34 moves piston 22 upward in cylinder 16, the decreasing pressure inside cylinder 16 causes valve ball 36 to move upward against the lower end of spring 34, opening lower ball valve chamber 32 to passage 70. When lower ball valve chamber 32 is open, condiment may flow from inside container 12 through passage 70 into cylinder 16 below piston 22.

When force is exerted on the knob 26, moving piston 22 downward, increase pressure within cylinder 16 causes valve ball 36 to seal lower ball valve chamber 32, at passage 70 thereby iorcing condiment to enter the side arm passage 42.

Side arm passage 42 extends upwardly from lower ball valve chamber 32. At the upper end of side arm tube 42 is an upper ball valve 43. Like lower ball valve 31, upper ball valve 43 contains an upper valve ball 46 in an upper ball valve chamber 44.

When spring 34 moves piston 22 upward in cylinder 16, upper valve ball 46 seals upper ball valve chamber 44 at side arm passage 42, preventing backward movement of condiment in the upper bali valve chamber 44 into side arm passage 42. When downward pressure is applied to knob 26, forcing piston 22 downward, the force of the condiment in side or passage 42 against upper ball valve chamber 44 opens upper ball valve 43, allowing condiments to flow therethrough.

A plug 52 is located at the top of upper ball valve chamber 44. Preferably, plug 52 has a concentric hole. Condiment flows out of upper ball valve chamber 44 through the hole in plug 52 and exits container 12 via a spout 62.

In the preferred embodiment, the upper end of plug 52 extends upwardly through a hole in lid 14. The upper end of plug 52 is equipped with a threaded screw 58. A threaded nut 60 engages threaded screw 58 to secure plug 52 to lid 14. Alternatively, threaded screw 58 of plug 52 and threaded nut 60 may be omitted, and plug 52 may be welded directly to lid 14.

Plug 52 is litted with a seal 54 for sealing between the plug 52 and upper ball valve 43. Seal 54 may be a ring, gasket, or some other device known in the art capable of sealing.

A pin (not shown) may be placed through lid 14 into plug 52 for locking the spout 62 into one or more positions.

Spout 62 extends upwardly from the hole in plug 52 to direct condiment out of container 12. Spout 62 may be of different lengths, diameters and angles. Preferably, spout 62 is welded to threaded screw 58 of plug 52 that mates with threaded nut 60.

Upper valve ball 46 must be prevented from blocking the passage to spout 62. To this end, a spout extension 64 extends downwardly through the hole in plug 52. Spout extension 64 may be constructed in different shapes.

The diameter of upper valve ball 46, the inner dimensions of spout 62. and the shape of spout extension 64 combine to keep upper valve ball 46 a predetermined distance from the lower opening of spout 62. This allows condiment chunks to flow unhindered through the opening without plugging upper basil valve chamber 44 or spout 62, or straining of food chunks.

Figures 2A, 2B:
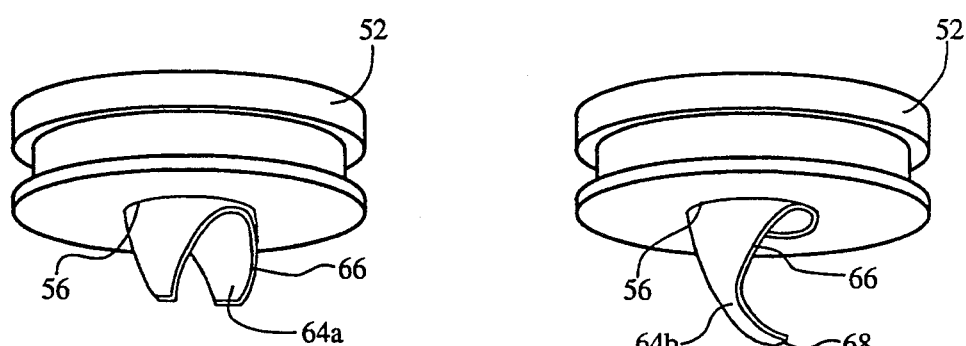
FIG. 2A is an enlarged perspective view of the spout/plug assembly of the condiment pump of FIG. 1.
FIG. 2B is an enlarged perspective view of an alternative embodiment of the spout/plug assembly of the condiment pump of FIG. 1.

Referring now to FIGS. 2A and 2B, there are shown enlarged perspective views of two different embodiments of the spout/plug assembly of the condiment pump.

Referring first to FIG. 2A, there is shown plug 52 having a concentric hole 56. A spout (not shown) extends upwardly through a hole in the lid of the container 12. A spout extension 64a extends downwardly through concentric hole 56 in plug 52 into upper ball valve chamber 44. Spout extension 64a is constructed of two cyilinear elements that taper from top to bottom on two sides. Spout extension 64a is shaped by two angular flat cuts 66.

Turning to FIG. 2B, there is shown an enlarged perspective view of an altecnative embodiment spout extension 64b of the spout/plug assembly of the condiment pump. The spout extension 64b extends downwardly through hole 56 in plug 52. Spout extension 64b has a flat, angular edges 66 like the spout extension 64b illustrated in FIG. 2A. Spout extension 64b is constructed of a single piece shaped to form a hook-like projection. The end 68 of spout extension 64b must be positioned close enough to the wall of upper ball valve chamber 44 so that upper valve ball 46 cannot enter the lower opening of the spout 62.

Figure 3:
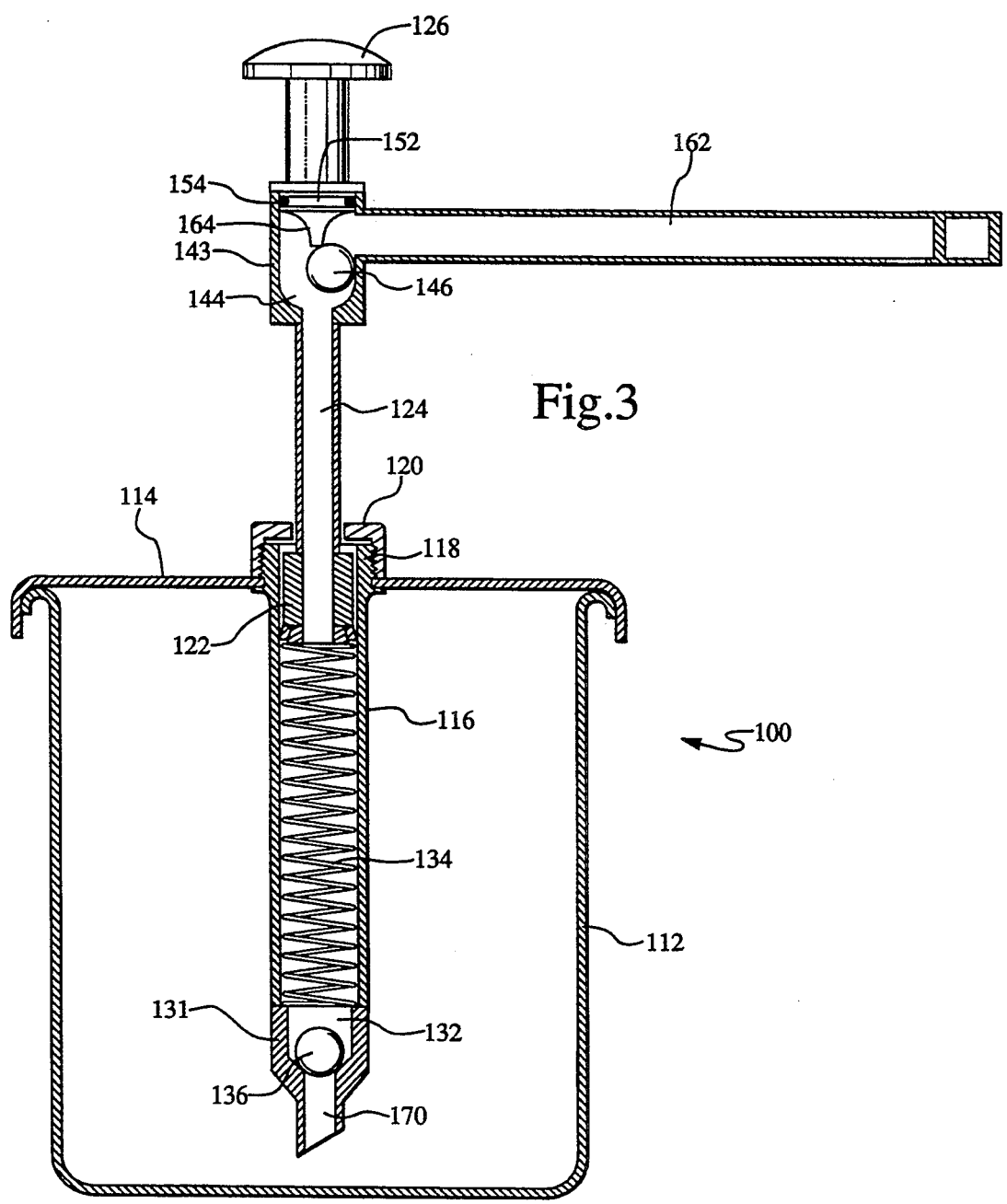
FIG. 3 is a cross-sectional side view of an alternative embodiment of the condiment pump according to the present invention.

Referring now to FIG. 3, there is shown an alternative embodiment 100 of the condiment pump. The alternative embodiment 100 has many of the components of the preferred embodiment condiment pump 10, including the container 112, lid 114, cylinder 116, threaded upper end of the cylinder 118, threaded cylinder nut 120, piston 122, piston rod 124, knob 126, lower ball valve 131, lower ball valve chamber 132, spring 134, lower valve ball 136, upper ball valve 143, upper ball valve chamber 144, upper valve ball 146, plug 152, seal 154, and spout 162. Accordingly, only the components that are different will be described in detail.

Alternative embodiment 100 does not have a side arm tube. Instead, a hollow piston rod 124 serves the function of the side arm tube.

The upper ball valve 133 is located at the upper end of the piston rod 124. As in the preferred embodiment, the upper ball valve 143 contains a valve ball 146 in a ball valve chamber 144.

A plug 152 covers the upper end of upper ball valve chamber 44. Plug 152 is similar to plug 52 of the preferred embodiment condiment pump 10, however plug 152 has no hole or upper threaded end. Seal 154 seals between plug 152 and upper ball valve chamber 144. A knob 126 is located above plug 152.

Plug 152 has no anchoring means for attachment to container 112. When internal pressure is exerted on plug 152, that pressure is resisted by the force of the operator's hand against knob 126.

Whereas the preferred embodiment condiment pump 10 has an extension extending from the spout, the alternative embodiment condiment pump 100 has a plug extension 164 extending from plug 152. Although FIG. 3 shows plug extension 164 shaded like the spout extension illustrated in FIG. 2A, other shapes of extensions, such as the spout extension of FIG. 2B, may also be used.

Plug extension 164 extends downwardly into upper ball valve chamber 144. Plug extension 164 keeps upper valve ball 146 a predetermined distance from the spout aperture on the side of upper ball valve chamber 144. This allows condiment chunks to pass through spout 162 without plugging upper ball valve chamber 144 or spout 162, or straining of food chunks.

Spout 162 extends outward from the side of upper ball valve chamber 144. Spout 162 may be of different lengths, diameters and angles. In alternative embodiment condiment pump 100, spout 162 moves up and down with knob 126.

In the alternative embodiment, movement of condiment through condiment pump 100 is similar to that in preferred embodiment 10. When spring 134 moves piston 122 upward in cylinder 116, the decreasing pressure inside cylinder 116 causes lower valve ball 136 to move upward against the lower end of spring 134, opening lower ball valve chamber 132. When lower ball valve chamber 132 is open, condiment may flow from inside container 112 through lower ball valve chamber 132 into the space below piston 122. Substantially simultaneously, upper valve ball 146 seals upper ball valve chamber 144, preventing backward movement of condiment through upper ball. valve chamber 144 into the hollow center of piston rod 124.

When downward pressure is placed on knob 126 forcing piston 122 downward, pressure within cylinder 116 increases, causing lower valve ball 136 to seal lower ball valve chamber 132. The sealing of lower ball valve chamber 132 prevents backward movement of condiment through passage 170, forcing condiment to enter hollow piston rod 124. Upper ball valve chamber 144 opens, allowing condiment to flow through hollow piston rod 124 out spout 162.

The alternative embodiment condiment pump of the present invention has several advantages over prior art pumps. It costs less to construct than other condiment pumps, and it is easier to clean than a fixed spout condiment pump.

Although preferred and alternative embodiments of the present invention have been illustrated in the accompanying Drawings and described in the foregoing Detailed Description, it will be understood that the invention is not limited to the embodiments disclosed, but is capable of numerous rearrangements, modifications and substitutions of parts and elements without departing from the spirit of the invention.

I claim:

1. In a condiment pump comprising a container; a cylinder extending downwardly into the container; a piston, within the cylinder; a piston rod connected to the piston, and extending above a top of the container; bias means for biasing the piston upward; a lower ball valve disposed at a bottom of the cylinder including a lower ball valve chamber and a lower ball moveable therein; a side arm tube, extending from the lower ball vane chamber to the top of the container; an upper ball valve disposed at an upper end of the side arm tube including an upper ball valve chamber and an upper ball moveable therein; and a removable spout, extending upwardly from the upper ball valve chamber of the side arm tube, the improvement comprising:
    the upper ball valve chamber including a plug positioned substantially eqaal inside and outside the container and defining an aperture therein for permitting passage of condiment chunks therethrough from the upper ball valve chamber; and
    means connected to the spout and extending downwardly therefrom through the aperture in the plug into the upper ball valve chamber for maintaining said upper ball a predetermined distance from the aperture in said plug to permit passage of condiment chunks through said spout.

2. A condiment pump, as recited in claim 1, wherein said means connected to the spout for maintaining said upper ball valve ball a predetermined distance from said aperture tapers downwardly from top to bottom on two sides.

3. A condiment pump, as recited in claim. 1, wherein said means connected to the spout for maintaining said upper ball valve ball a predetermined distance from said aperture is hook-shaped.

4. A condiment pump, comprising:
    a container;
    a cylinder, extending downwardly into the container;
    a piston, within the cylinder;
    a piston rod, connected to the piston and extending above a top of the container;
    bias means for biasing the piston upward;
    a lower ball valve. near a bottom of the cylinder, having a lower ball moveable in a lower ball valve chamber;
    a side arm tube, extending upwardly from the lower ball valve chamber;
    an upper ball valve, at an upper end of the side arm tube, having an upper ball moveable in an upper valve chamber;
    a removable spout, extending upwardly from the upper ball valve;
    the upper ball valve. chamber including a plug, positioned substantially equally inside and outside the container, and defining an aperture concentric in the plug to permit passage of condiment chunks therethrough; and
    a spout extension, connected to and extending downwardly from the spout into the upper ball valve chamber to maintain said upper ball a predetermined distance from the aperture in the plug to permit passage of condiment chunks therethrough.

5. A condiment pump, as recited in claim 4, wherein the spout extension tapers from top to bottom on two sides.

6. A condiment pump, as recited in claim 4, wherein the spout extension is hook-shaped.

7. A condiment. pump, as recited in claim 4, further comprising a lid on the container.

8. A condiment pump, comprising:
    a container;
    a cylinder, extending downwardly into the container;
    a piston, within the cylinder;
    a hollow piston rod, connected to the piston and extending above a top of the container;
    bias means for biasing the piston upward;
    a lower ball valve. near a bottom of the cylinder, having a lower ball moveable in a lower ball valve chamber;
    an upper ball valve, at the upper end of the piston rod, having an upper ball moveable in an upper ball valve chamber;
    a spout, connected at one end to the upper ball valve chamber and extending outwardly therefrom;
    a plug, disposed internally in the upper ball valve chamber in an upper end; and
    a plug extension, extending downwardly from the plug into the upper ball valve chamber to maintain said upper ball a predetermined distance from the end of the spout, to permit passage of condiment chunks through the end of the spout.

9. A condiment pump, as recited in claim 8, wherein the plug extension tapers from top to bottom on two sides.

10. A condiment pump, as recited in claim 8, wherein the plug extension is hook-shaped.

11. A condiment pump, as recited in claim 8, further comprising a lid on the container.

* * * * *